Patented Aug. 4, 1925.

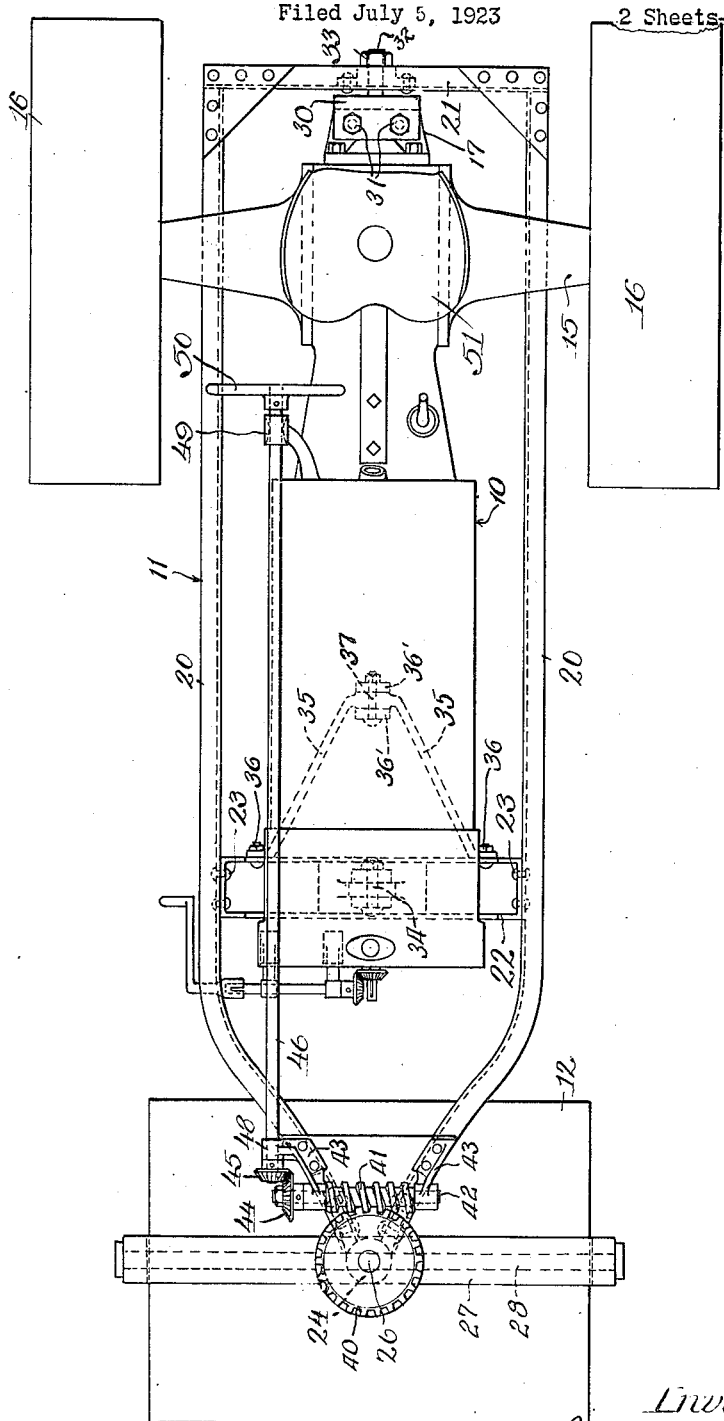

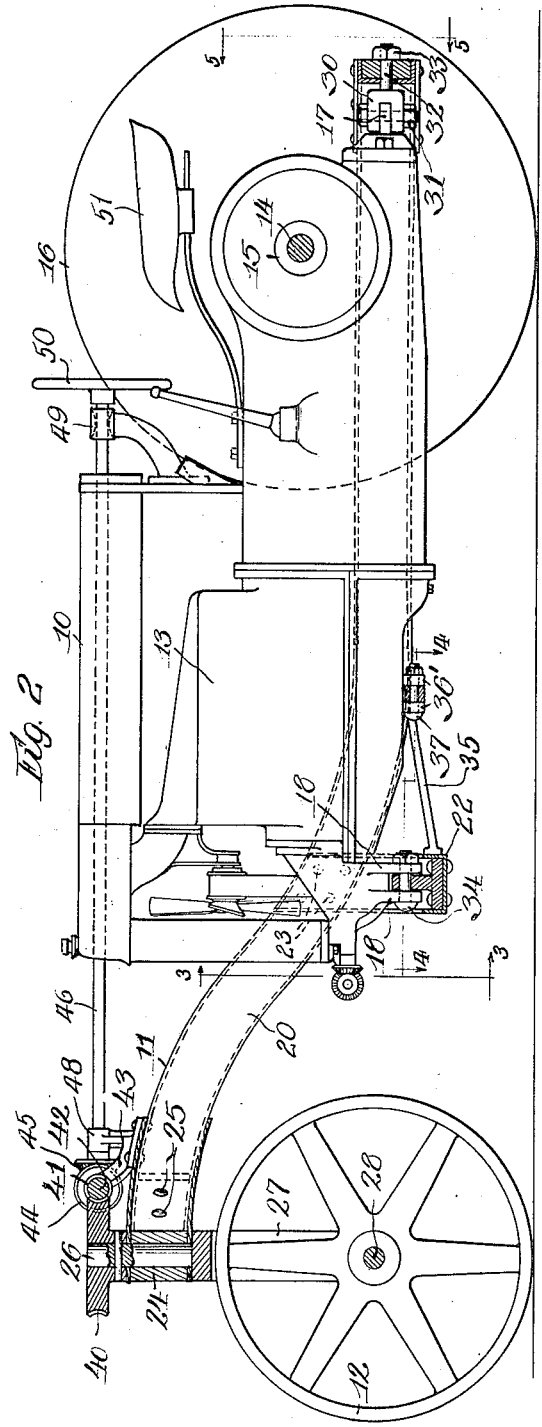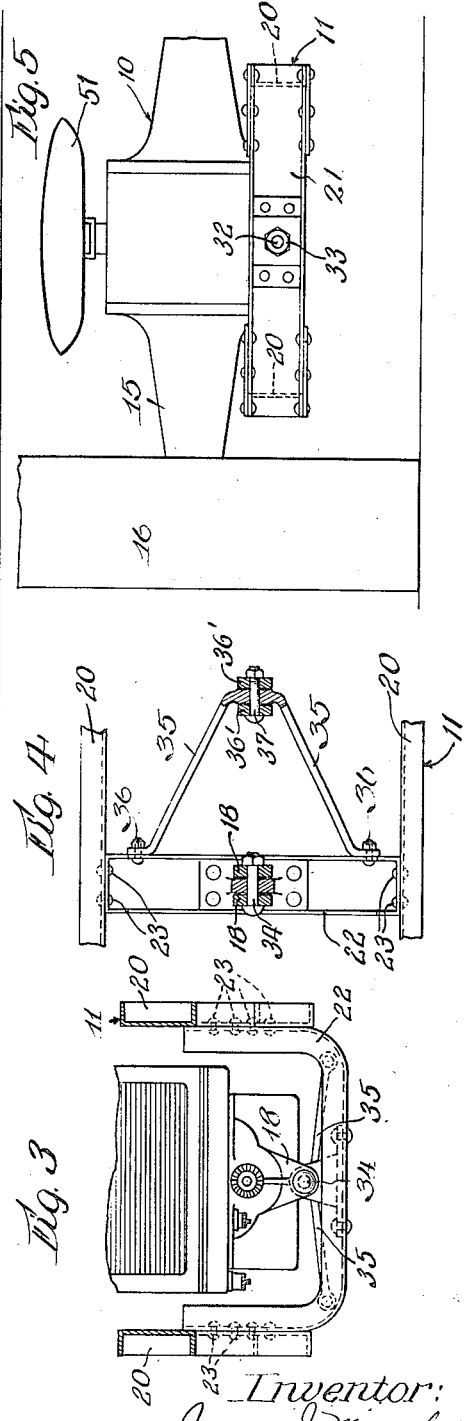

1,548,695

UNITED STATES PATENT OFFICE.

JAMES I. WINCHELL, OF DAVENPORT, IOWA.

ROAD ROLLER.

Application filed July 5, 1923. Serial No. 649,766.

*To all whom it may concern:*

Be it known that I, JAMES I. WINCHELL, a citizen of the United States, residing at Davenport, in the county of Scott and State of Iowa, have invented certain new and useful Improvements in Road Rollers, of which the following is a specification.

The main object of my invention is to provide a power-propelled road-roller of improved construction.

Another object of my invention is to provide a road-roller which comprises a tractor whereby the road-roller may be propelled, the construction of the road-roller being such that one of the tractors now in existence could be employed as a part of the road-roller.

A further object of my invention is to provide an improved power-propelled road-roller wherein a driving mechanism which includes traction wheels may adjust itself with respect to the frame and the roll, or other ground engaging tool, of the tractor as the tractor is propelled over an uneven roadway. Other objects of my invention will become apparent as the detail description progresses, reference being had to the accompanying drawings, wherein—

Fig. 1 is a plan of my improved road-roller.

Fig. 2 is a central vertical section taken through the road-roller.

Figs. 3, 4, and 5 are sections taken on lines 3—3, 4—4 and 5—5, respectively, of Fig. 2.

As shown in Figs. 1 and 2 of the drawings, my improved road-roller comprises a tractor element which is designated in its entirety by the reference character 10, a frame 11, and a roll 12. It will become apparent as the description progresses that the roll 12 may be replaced by a roll of different design or by any other suitable round engaging tool, and by the word "roll", as used in the claims, I intend to define any such tool.

I prefer to show as the tractor element 10, the well known Fordson tractor, as the construction of this tractor is such that it may be quickly and easily incorporated in my improved road-roller. As shown, the tractor element 10 comprises an internal combustion engine 13 which by means of suitable gearing (not shown) is adapted to drive a rear axle 14 suitably journaled in bearings 15, the bearings 15 being rigid with respect to the crank case of the internal combustion engine 13. The rear axle 14 is provided with a pair of traction wheels 16. A drawbar 17 provides means whereby the tractor may be connected to a vehicle or the like in a manner and for purposes well known to those skilled in the art. A pair of lugs 18 which project downwardly from the forward end of the internal combustion engine 13 are usually employed to connect an axle to the tractor, but when the tractor forms a part of my improved road-roller the lugs 18, together with the drawbar 17, form means for operatively connecting the tractor to the frame 11.

The frame 11 extends along and substantially parallel to the tractor and comprises side members or bars 20, a rear member or bar 21 and a cross bar 22 which is rigidly secured to the side bars 20 intermediate their ends by rivets 23. The forwardly extending ends of the side bars 20 are bent toward each other and each of them is rigidly secured to a bracket 24 by rivets 25. The bracket 24 is adapted to rotatably journal a vertically disposed shaft 26 which is rigidly secured at its lower end to a bifurcated bracket 27, the bifurcated bracket 27 being adapted to rotatably journal a shaft 28 which carries the aforementioned roll 12.

The means for operatively connecting the frame 11 to the tractor 10 comprises a clevis 30 which is rigidly secured to the drawbar 17 by means of a plurality of bolts 31. The clevis 30 is provided with a rearwardly extending stud shaft or bolt 32 which passes through the rear member 21 of the frame and which may be said to pivotally secure the frame to the drawbar. The rear member 21 of the frame 11 is held in place upon the bolt 32 by means of a nut 33 threaded upon the bolt. By this arrangement it will be evident that there is provided a driving connection at the portion of the tractor designed to be used for that purpose. The cross bar 22 of the frame is adapted to support the forward end of the tractor 10, the forward end of the tractor being secured to the cross bar by means of a bolt 34 which passes through suitable apertures in the lugs 18 and the cross bar. While this construction in itself is sufficient to give a suitable connection between the forward end of the tractor and the cross bar 22, I prefer to utilize a pair of integral radius rods 35, the forwardly extending ends of which are rigidly secured to the cross bar 22 by means of a plurality of bolts 36. As shown in Figs. 2 and 4, the integral radius rods 35 are formed of a bar which is secured intermediate its ends between a pair of lugs 36' projecting downwardly from the crank case of the internal combustion engine 13. The means for connecting the bar, which comprises the radius rods 35, to the lugs 36' consists of a bolt 37 which passes through the lugs and the bar. The bolts 34 and 37 merely form pivotal connections between the frame and the tractor to secure the two together and to insure that the tractor will be supported upon the frame, the driving connection being furnished by the draw-bar and bolt 32. It will be noted that the frame 11 is pivotally secured to the tractor 10 solely by means of the several bolts 32, 34, and 37. It will also be noted that the bolts 32, 34, and 37 have their axes disposed parallel to one another and in a central longitudinal plane of the tractor 10. While in the embodiment of my invention, which is illustrated in the drawings, the bolts 33, 34, and 37 are in substantial alignment, it will be readily understood that the tractor may be constructed so as to have the axes of the bolts coincident. However, as the several bolts are spaced from each other and as the bolts fit loosely in the several apertures which receive them, the frame may be angularly displaced by an axis parallel to, and determined by, the axes of the bolts. This construction permits the frame to lie in a plane which is determined by the roadway directly underneath the roll 12 and at the same time permits the tractor 10 to occupy a position which is determined by that portion of the roadway which is directly underneath the traction wheels 16. An advantage of this construction is that the side bars 20 of the frame will not become distorted when the road-roller is passing over a rough or uneven roadway.

I have provided steering mechanism for the road-roller, the steering mechanism comprising a worm wheel 40 rigidly secured to the upper end of the shaft 26. The worm wheel 40 meshes with a worm 41 rigidly secured to a shaft 42 rotatably journaled in the brackets 43 which are rigidly secured to the frame 11. Rigidly secured to one end of the shaft 42 is a bevel gear 44 adapted to mesh with a bevel gear 45, the bevel gear 45 being rigidly secured to one end of a steering shaft 46. The steering shaft 46 is rotatably journaled in suitable bearings 48 and 49, the bearing 48 being rigidly secured to the frame 11 and the bearing 49 being rigidly secured to the tractor 10. These bearings 48 and 49 are adapted to permit relative displacement between the frame 11 and the tractor 10 without injury to the steering shaft 46. The steering shaft 46 is provided with a steering wheel 50 which is conveniently disposed with respect to seat 51 provided upon the tractor 10. The mode of operation of the steering mechanism is well known and need not be described.

As plainly shown in Figs. 1, 2 and 3, the usual handle which is furnished with this type of tractor to crank the engine, is replaced by a shaft 60, having thereon a beveled gear 61 meshing with a beveled gear 62 on a shaft 63 supported in one or more suitable brackets 64 detachably secured to the front of the engine, and provided at its outer end with any suitable means to engage a handle 65, which may be detachably secured to the shaft 63 to rotate the same. It is, of course, understood that the inner end of the shaft 60 is provided with suitable means corresponding to the means on the end of the ordinary cranking handle, whereby the engine may be cranked. By this means it is not necessary for a person to climb in between the side frame members 20 to crank the engine, this being not only inconvenient, but at times dangerous. The means which I have shown are readily attached to and detached from an engine by bolts, or the like, without requiring any material change in existing structure.

I am aware that changes in the form, construction and arrangement of parts may be made without departing from the spirit and without sacrificing the advantages of the invention and I reserve the right to make all such changes as fairly fall within the scope of the following claims:

I claim—

1. A road roller comprising a tractor, a drawbar, a frame, means for pivotally securing the frame to the drawbar, means for pivotally securing the frame to the forward end of the tractor, a roll mounted in the forward end of the frame, and steering mechanism associated with the roll.

2. In a road-roller, the combination with a tractor and a drawbar, of a frame comprising side members, a rear member, and a cross member intermediate its ends, together with means for pivotally securing the rear member of the frame to the drawbar, means for pivotally securing the cross member of the frame to the forward end of the tractor, a roll mounted in the forward end of the frame, and steering mechanism associated with the roll.

3. In a device of the class described, a tractor, a frame extending substantially the entire length of said tractor and carrying a ground engaging roll, and pivotal connections between said tractor and said frame adjacent the front and rear ends of said tractor, the pivotal connection adjacent said rear end forming a driving connection between said tractor and said frame, and the frame supporting the front end of said tractor at said pivotal connection adjacent the front end thereof.

4. In a device of the class described, a frame comprising side bars, a roll pivotally mounted to said frame at one end thereof, a tractor disposed between said side bars, a plurality of transverse members rigidly connecting said side bars adjacent both ends of said tractor, and means pivotally connecting said tractor to said transverse members.

5. In a device of the class described, a frame comprising side bars, a roll pivotally mounted to said frame at one end thereof, a tractor disposed between said side bars, a plurality of transverse members rigidly connecting said side bars adjacent both ends of said tractor, means pivotally connecting said tractor to said transverse members, and means for steering said roll.

6. In a device of the class described, a frame having side members, a roll pivoted to said frame about a vertical axis, and a tractor disposed between said side members and having a drawbar pivoted to said frame about a horizontal axis.

7. In a device of the class described, a frame having side members, a roll pivoted to one end of said frame about a vertical axis, a tractor disposed between said side members and a drawbar connecting said tractor and frame and pivoted to said frame about a horizontal axis.

8. In a device of the class described, a frame having ground-engaging means, a tractor having ground-engaging means, one end of said tractor being supported by said frame and the other end of said tractor having a drawbar pivoted to said frame.

9. In a device of the class described, a frame having ground-engaging means, a tractor having ground-engaging means and having one end pivotally supported by said frame about a horizontal longitudinal axis, and the other end of said tractor being connected to said frame by a drawbar, said drawbar being pivoted to said frame about a horizontal longitudinal axis.

10. In a device of the class described, a frame having side members, a roll supporting one end of said frame, said frame and said roll being pivoted to each other about a vertical axis, a tractor disposed between said side members and the other end of said frame being pivoted to said tractor about a horizontal axis.

11. In a device of the class described, a frame, a roll supporting one end of said frame, said frame and said roll being pivoted to each other about a vertical axis, a tractor, the other end of said frame being pivoted to said tractor about a horizontal axis, and a second pivotal connection between said frame and said tractor, the axes of said two last named pivots being substantially parallel.

12. In a device of the class described, a tractor having a rear axle, a frame having side members extending beneath said axle and free to move in relation thereto, a cross-member connecting said side members, a drawbar on said tractor and pivoted to said cross-member, a second cross-member connecting said side members, a pivotal connection between said tractor and said second named cross-member, and a roll carried by said frame.

13. In a device of the class described, a tractor having a rear axle, a frame extending beneath said axle and free to move in relation thereto, means to support the front end of said frame on the ground, a draw bar on said tractor and pivoted to said frame rearwardly of said axle, and a second pivotal connection between said frame and said tractor adjacent the front end of said tractor and supporting the tractor on the frame.

JAMES I. WINCHELL.